(12) United States Patent
Gvirtsman et al.

(10) Patent No.: US 9,276,820 B2
(45) Date of Patent: Mar. 1, 2016

(54) OBTAINING AND DISPLAYING NETWORK TOPOLOGY INFORMATION

(75) Inventors: Ahi Gvirtsman, Tel Aviv (IL); Nadav Sharir, Rishon Letzion (IL); Uri Ben-Dor, Givat Shmuel (IL)

(73) Assignee: Hewlett Packard Enterprise Development LP, Houston, TX (US)

( * ) Notice: Subject to any disclaimer, the term of this patent is extended or adjusted under 35 U.S.C. 154(b) by 809 days.

(21) Appl. No.: 13/192,382

(22) Filed: Jul. 27, 2011

(65) Prior Publication Data

US 2012/0023409 A1      Jan. 26, 2012

Related U.S. Application Data

(62) Division of application No. 12/510,020, filed on Jul. 27, 2009, now abandoned.

(51) Int. Cl.
*G06F 15/16* (2006.01)
*H04L 12/24* (2006.01)

(52) U.S. Cl.
CPC ............... *H04L 41/22* (2013.01); *H04L 41/12* (2013.01); *H04L 41/0853* (2013.01)

(58) Field of Classification Search
CPC ...... H04L 41/12; H04L 41/22; H04L 41/0853
USPC ............. 709/223, 224, 220; 370/254, 400; 715/735
See application file for complete search history.

(56) References Cited

U.S. PATENT DOCUMENTS

| | | | |
|---|---|---|---|
| 6,205,122 B1 * | 3/2001 | Sharon et al. | 370/254 |
| 7,149,975 B1 * | 12/2006 | Johnson et al. | 715/734 |
| 7,523,187 B1 * | 4/2009 | Lavallee et al. | 709/223 |
| 7,543,045 B1 * | 6/2009 | Agrawal et al. | 709/220 |
| 7,590,072 B2 * | 9/2009 | Radi et al. | 370/254 |
| 2003/0009540 A1 * | 1/2003 | Benfield et al. | 709/220 |

* cited by examiner

*Primary Examiner* — Douglas Blair
(74) *Attorney, Agent, or Firm* — Hewlett Packard Enterprise Patent Department

(57) ABSTRACT

Computer-readable media, methods and network information computer systems are provided for obtaining network topology information about a relationship between a configuration item and a network of configuration items based upon a property of the selected configuration item, and displaying the network topology information as a topological map.

22 Claims, 5 Drawing Sheets

OBTAINING AND DISPLAYING NETWORK TOPOLOGY INFORMATION

RELATED APPLICATIONS

This is a divisional of U.S. patent application Ser. No. 12/510,020 filed 2009 Jul. 27 now abandoned.

BACKGROUND

Topology information for a network of configuration items often is stored in a configuration management database ("CMDB"). This information may be accessible using a query language such as the Structured Query Language ("SQL") or the Topological Query Language ("TQL"). Applications exist for creating and running database queries graphically. However, without intricate knowledge of query languages such as SQL or TQL, novice and even intermediate users have great difficulty using these applications to create or execute complex database queries. Moreover, existing solutions provide for the input of general criteria of configuration items and return configuration items that meet those general criteria. Existing applications do not provide for the input of a particular configuration item or return topology information about that particular configuration item's relationship to the network.

DETAILED DESCRIPTION

Computer-readable media, methods and network information computer systems are provided for obtaining network topology information about a particular configuration item's relationship to a network of configuration items, based upon a property of the configuration item.

Network topology information may include a plurality of configuration items and the relationships between them. Configuration items may include, but are not limited to hosts (i.e., computers and computer systems), software elements, network addresses, communication ports at which network services are found, and the like. The term "network" as used herein is not limited to computer networks, but rather should be understood as a network of configuration items. A computer network is just one example of a network of configuration items.

A selected configuration item's relationship to a network of configuration items can be understood as the selected configuration item's "perspective" of the network. Thus, the term "perspective" is used herein to describe a predefined CMDB query that receives one or more configuration items as input and returns network topology information about the selected configuration item's relationship to a network of configuration items, based on a property of the configuration item. A perspective may be created using various languages, such as SQL or TQL. Properties and perspectives will be more fully understood in view of the following description and drawings.

Figure 1:
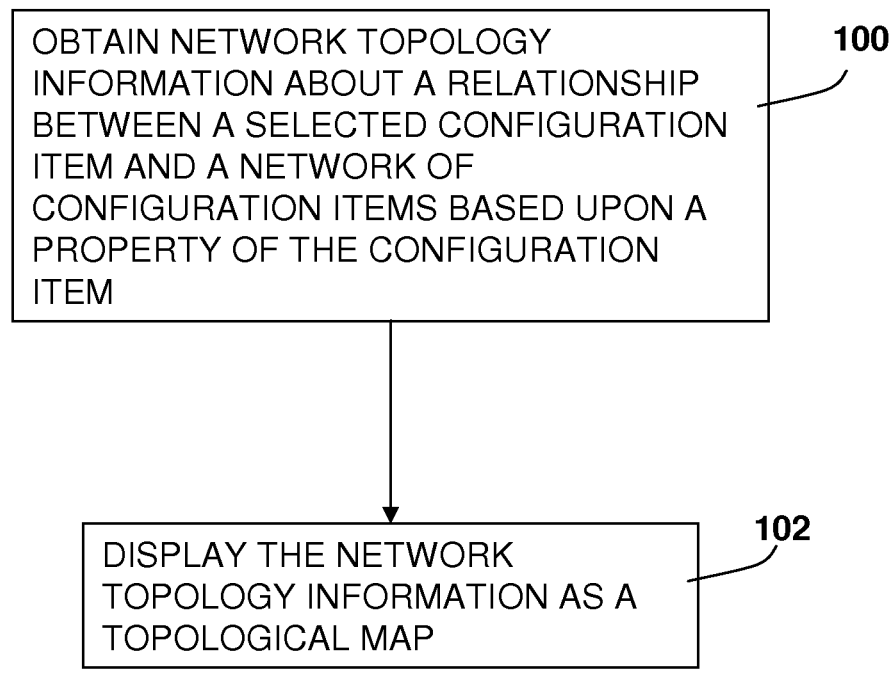
FIG. 1 depicts a method of obtaining and displaying network topology information according to an embodiment of the disclosure.

An example method of obtaining network topology information about a relationship between a configuration item and a network of configuration items is shown in FIG. 1. In step 100, network topology information about a relationship between a configuration item and a network of configuration items is obtained. A plurality of configuration items may be provided from which a configuration item of interest may be selected. For example, a user may be presented with a drop-down menu listing a number of configuration items. In some embodiments, the plurality of configuration items may be related. For example, a drop-down menu may include computer systems in the same building as the user, computer systems and devices on the same local or wide-area computer network, or more broadly, configuration items of a network of configuration items.

A plurality of perspectives also may be provided from which to select. As noted above, a perspective may receive one or more configuration items as input and may obtain network topology information about the configuration item's relationship to a network of configuration items, based upon a property of the configuration item. Put another way, a perspective is like a function that has one or more input parameters of type configuration item and returns network topology information. Examples of perspectives, such as those shown in FIGS. 2 and 4, will be discussed further below.

A CDMB is queried using the selected perspective and the one or more selected configuration items as input to obtain network topology information about a relationship between the one or more selected configuration items and a network. Obtaining network topology information may include identifying configuration items related to the one or more selected configuration items based upon a property of the one or more selected configuration items. Links from the related configuration items to the one or more selected configuration items (also referred to as a "network route"), as well as links between the related configuration items, also may be identified.

Figure 3:
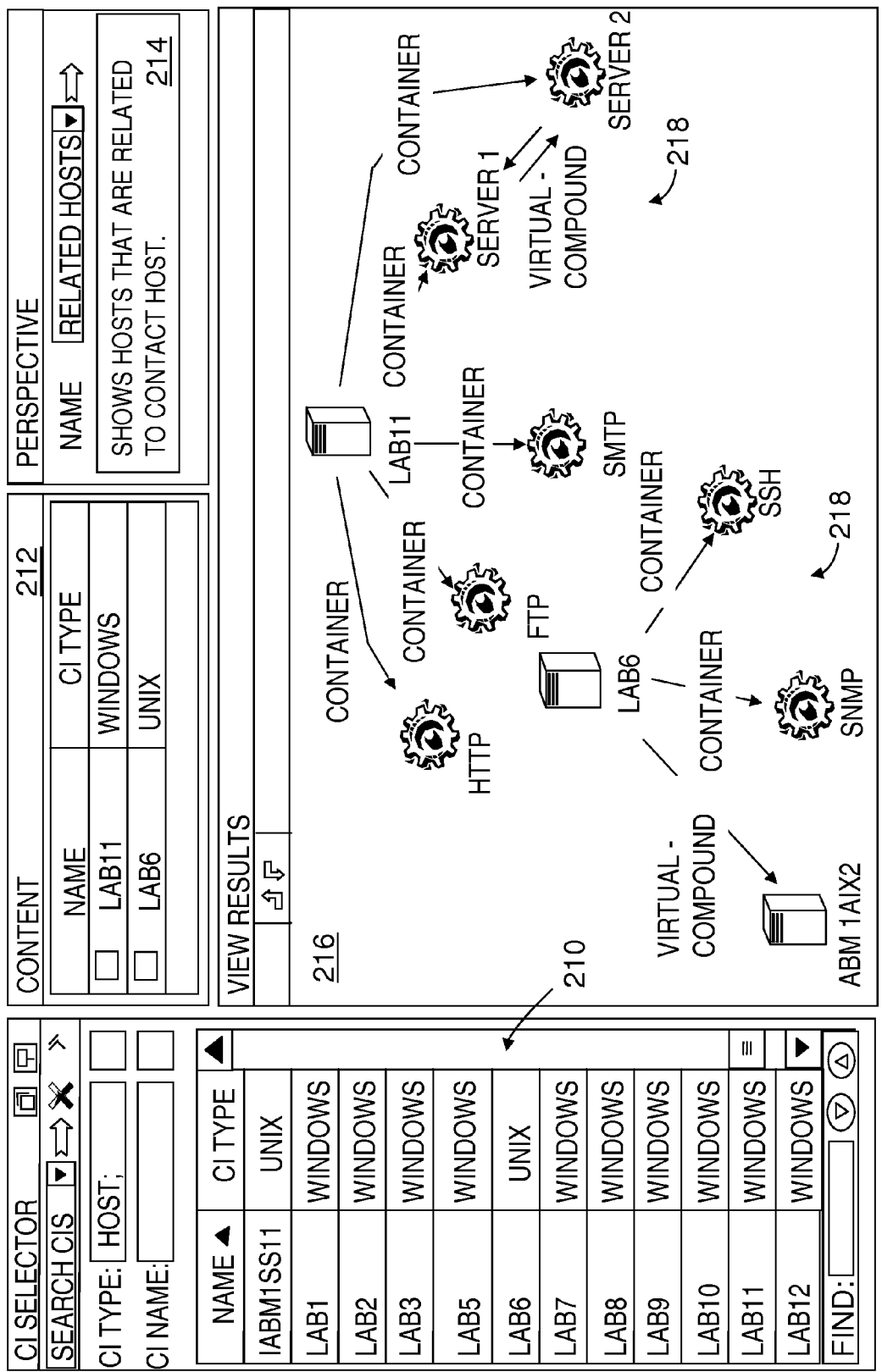
FIG. 3 depicts the GUI used to execute and view the results of the perspective of FIG. 2, according to an embodiment of the disclosure.
Figure 5:
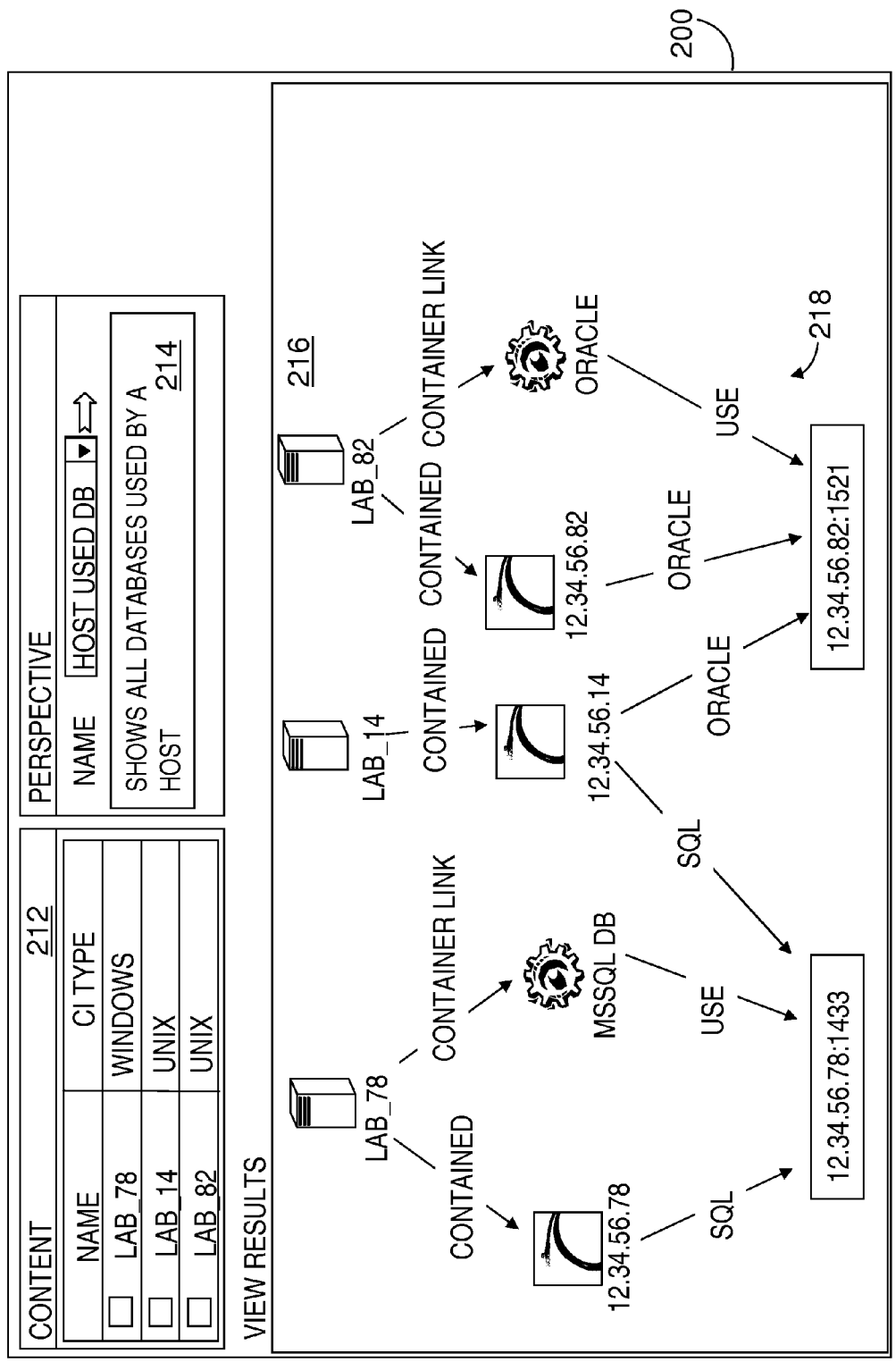
FIG. 5 depicts the GUI used to execute and view the results of the perspective of FIG. 4, according to an embodiment of the disclosure.

In step 102, the network topology information is displayed as a topological map. In some embodiments, the topological map is displayed in a hierarchal manner, with the selected configuration item at the top. FIGS. 3 and 5 both show examples of such topological maps.

A configuration item may have multiple perspectives of a network corresponding to multiple properties of the configuration item. A property of a configuration item that may be defined in a perspective may relate generally to processes executing on the configuration item (where the configuration item is a host), configuration items of the network of configuration items to which the configuration item has access, and so on. The following discussion describes several examples of properties that may be defined by perspectives.

One example of a property is a class of computer processes to which a particular computer process executing on a selected configuration item belongs. A class of computer processes may include related business applications, related database applications, clients and related servers, computer processes that were purchased together under a license, computer processes that share resources, and the like. Some of these classes include computer processes that communicate with each other over a particular networking layer, such as the Application Layer of the Internet Protocol Suite. The Internet Protocol Suite is defined in Request for Comments 1122, the contents of which are incorporated herein by reference for all purposes.

An example of such a class is customer relationship management ("CRM") applications (e.g., Siebel® applications), which generally communicate with each other over the Application Layer. A user can select a configuration item that is executing a CRM application and a perspective that queries a CMDB to identify configuration items on the same network that also are executing CRM and the relationships between them. The network topology Iinformation that is returned then may be displayed as a topological map.

Figure 2:
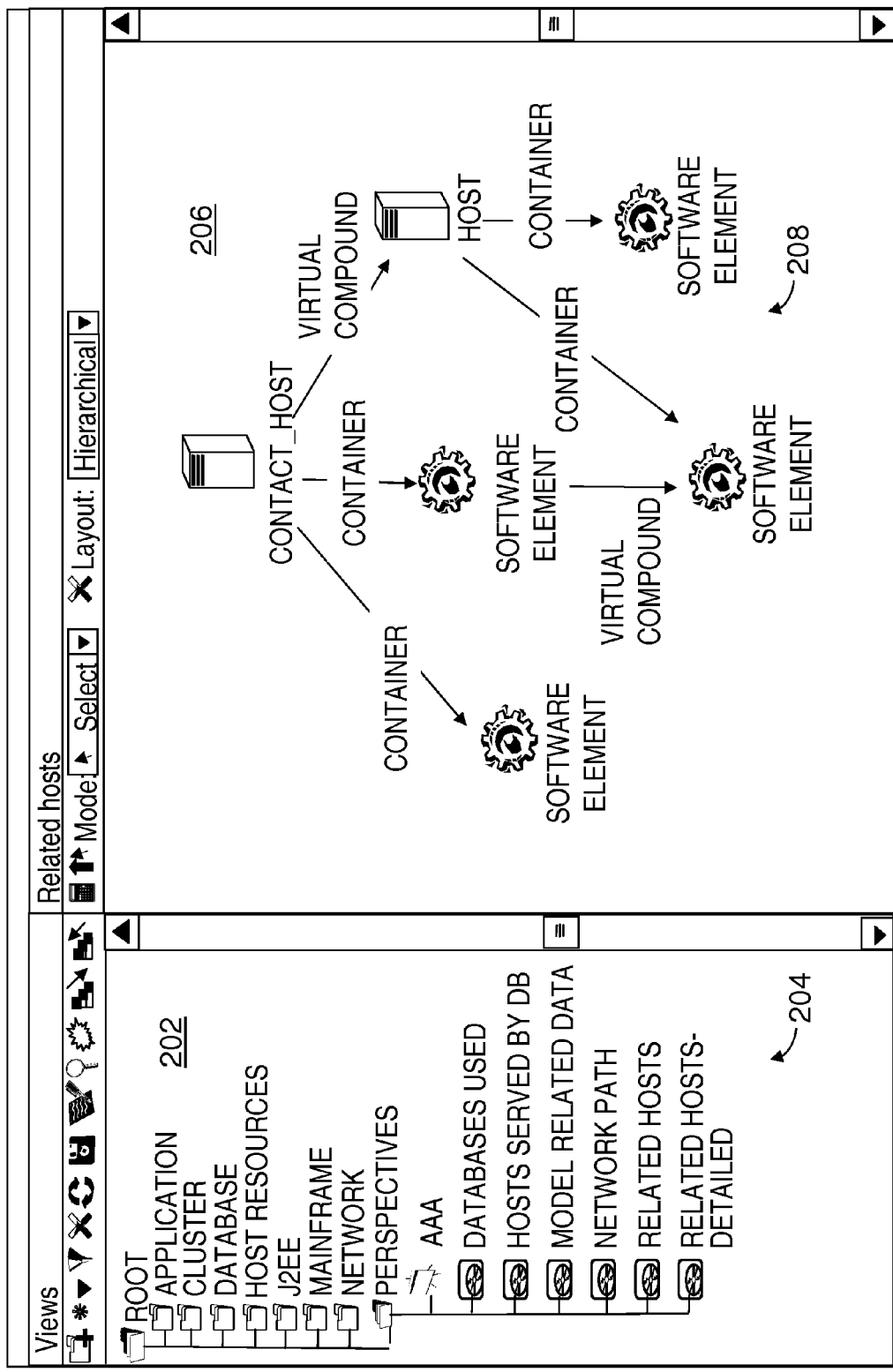
FIG. 2 is a schematic view of a graphical user interface ("GUI") for selecting/designing a perspective, according to an embodiment of the disclosure.

Another example property is defined in the perspective shown in FIG. 2. A GUI 200 includes a perspective selection area 202 that includes a list of perspectives 204 from which a user can select. In some embodiments a user also may design and edit perspectives using a similar GUI. A perspective viewing area 206 depicts the selected perspective 208 topologically. The selected perspective 208 in this example is configured to receive a single configuration item, CONTACT_HOST, as input, and to return related hosts, as well as software elements executing on those related hosts.

The left-most branch of perspective 208 seeks local software elements executing on the CONTACT_HOST. Local software elements may be any number of applications, such as server programs or CRM applications. The middle branch seeks software elements executing locally that are related to software elements executing remotely. For example, CONTACT_HOST may be executing an email client locally. This email client may be related to an email server program that is executing remotely, for instance, on a server computer in the same building. The right-most branch seeks hosts that are directly related to the CONTACT_HOST (e.g., computer systems connected to CONTACT_HOST via network cable), as well as software elements executing on the related host and any relationships between those software elements and other software elements previously mentioned.

To select one or more configuration items as input and to query the CMDB using the selected perspective, GUI 200 may switch to a view like the one shown in FIG. 3. A configuration item search area 210 on the left allows a user to search for configuration items to use as input to the perspective. In this example, a configuration type of "HOST" is selected, which limits the search results to configuration items that are computer systems. Other types of configuration items, such as software elements, may also be searched.

A configuration selection area 212 allows a user to select one or more configuration items returned from the search as input to the perspective. A perspective description area 214 describes the selected perspective and, in some embodiments, permits the selection of a different perspective.

Results of the perspective are displayed in a results area 216 as a topological map 218. In this example, two hosts (LAB11 and LAB6) were used as input. Because LAB11 and LAB6 are not directly related to one another (e.g., they are not part of the same local area network), two separate topological maps 218 are shown adjacent to one another. According to these results, LAB11 is executing a hypertext transport protocol ("HTTP") process, a file transfer protocol ("FTP") process, a simple mail transfer protocol ("SMTP") process, and two other servers, SERVER 1 and SERVER 2, that are related to one another. LAB6 is related to a host called AMB1AIX, and is running a simple network management protocol (SNMP) server and a secure shell (SSH) server.

Figure 4:
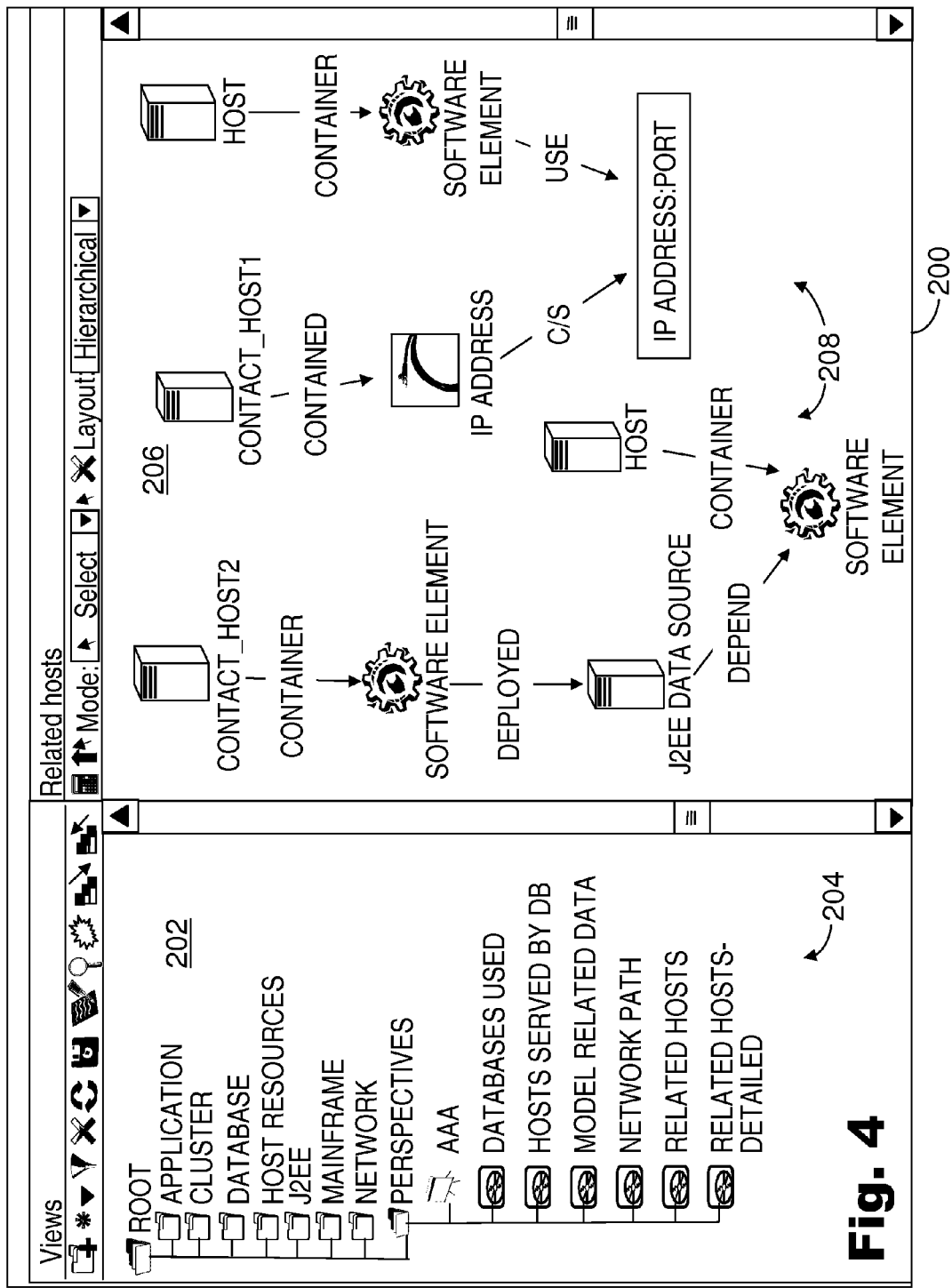
FIG. 4 depicts the GUI used to select another perspective, according to an embodiment of the disclosure.

Another property that may be defined in a perspective is configuration items to which a selected configuration item has access and that share a second property. FIG. 4 depicts a perspective that returns configuration items to which CONTACT_HOST1 and CONTACT_HOST2 have access and that are database configuration items.

The perspective 208 on the right seeks in its left branch the IP address of CONTACT_HOST1, as well as a server IP address and port (e.g., TCP) to which CONTACT_HOST1's communicates as a client. If CONTACT_HOST1 is executing a database locally, then CONTACT_HOST1's IP address is the same as the server IP address. The perspective 208 on the right seeks in its right branch software elements that use the server IP address and port, as well as the host that is executing the software element. Although not shown in the drawing, the software elements may have properties that may be adjusted (e.g., by right-clicking on the software element) to limit the software elements to a particular type of software, which in this example is database software.

The perspective on the left seeks software elements executing locally on CONTACT_HOST2, Java 2 Platform, Enterprise Edition ("J2EE") data sources that are deployed by the local software elements, software elements upon which those J2EE data sources depend, and the hosts executing those software elements upon which those J2EE data sources depend.

FIG. 5 depicts the results 218 from a CMDB when queried with the perspective of FIG. 4 and three configuration items, LAB_78, LAB_14 and LAB_82. LAB_78 has an IP address of 12.34.56.78 and is executing a Microsoft® SQL Server on TCP port 1433 (the default port for such applications). LAB_82 has an IP address of 12.34.56.82 and is executing an Oracle® database server on TCP port 1521 (the default port for such applications). LAB_14 has an IP address of 12.34.56.14. LAB_14 is not executing any database servers, but has access to both the MSSQL and Oracle servers running on the other two machines.

The disclosure set forth above may encompass multiple distinct embodiments with independent utility. The specific embodiments disclosed and illustrated herein are not to be considered in a limiting sense, because numerous variations are possible. The subject matter of this disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the inventions of the present disclosure.

Where the claims recite "a" or "a first" element or the equivalent thereof, such claims include one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

What is claimed is:

1. A method comprising:
   using a computer to display a user interface presenting a perspective selection area including plural perspective representations and a configuration-item selection area including plural configuration-item representations, each of said configuration-item representations corresponding to a configuration item of a network of configuration items, said perspective representations representing respective perspectives, each of said perspectives defining a set of one or more relationship types of relationships among said configuration items; and upon user selection of
- a first perspective representation from said perspective selection area and corresponding to a first perspective; and
- at least a first configuration-item representation from said configuration-item selection area and corresponding to a first configuration item, generating a query for information regarding said first configuration item and its relationships with other configuration items according to said first perspective.

2. A method as recited in claim 1 further comprising, upon receiving said information in response to said query, displaying said information as a first topological map.

3. A method as recited in claim 1 wherein:
said user selection further includes selection of a second configuration-item representation from said configuration-item selection area and corresponding to a second configuration item; and
said information further regards said second configuration item and its relationships with other configuration items according to said first perspective.

4. A method as recited in claim 3 further comprising, upon receiving said information in response to said query, displaying said information in the form of a first topological map depicting said first configuration item and a second topological map depicting said second configuration item.

5. A method as recited in claim 4 wherein whether or not a connection is displayed between said first, and second topological maps depends on the selected perspective.

6. A method as recited in claim 3 wherein said first perspective corresponds to a class of processes to which processes executing on said first and second configuration items belong.

7. A method as recited in claim 1 wherein the relationship type is defined by a configuration-item property.

8. A method as recited in claim 7 wherein said property is a class of computer processes.

9. A method associated in claim 8 wherein processes of said class communicate with each other over an Internet Protocol Application Layer.

10. A method as recited in claim 7 wherein said property is the set of configuration items to which a selected configuration item has access.

11. A method as recited in claim 1 wherein said first perspective defines a first property corresponding to configuration items to which a selected configuration item has access and that share a second property, said query returning configuration items to which said first configuration item has access and that have said second property.

12. A system comprising non-transitory tangible computer-readable storage media encoded with code configured to, when executed by a processor:
display a user interface presenting a perspective selection area including plural perspective representations and a configuration-item selection area including plural configuration-item representations, each of said configuration-item representations corresponding to a configuration item of a network of configuration items, said perspective representations representing respective perspectives, each of said perspectives defining a set of one or more relationship types of relationships among said configuration items; and in response to user selection of
- a first perspective representation from said perspective selection area and corresponding to a first perspective, and
- at least a first configuration-item representation from said configuration-item selection area and corresponding to a first configuration item, generate a query for information regarding said first configuration item and its relationships with other configuration items according to said first perspective.

13. A system as recited in claim 12 wherein said code is further configured to, upon receiving said information in response to said query, display said information as a first topological map.

14. A system as recited in claim 13 further comprising said processor and a display for displaying said topological map.

15. A system as recited in claim 12 wherein:
said user selection further includes selection of a second configuration item; and
said information further regards said second configuration item and its relationships with other configuration items according to said first perspective.

16. A system as recited in claim 15 further comprising, upon receiving said information in response to said query, displaying said information in the form of a first topological map depicting said first configuration item and a second topological map depicting said second configuration item.

17. A system as recited in claim 15 wherein whether or not said code causes to be displayed a connection between said first and second topological maps depends on the selected perspective.

18. A system as recited in claim 15 wherein said first perspective corresponds to a class of processes to which processes executing on said first and second configuration items belong.

19. A system as recited in claim 12 wherein the relationship type is defined by a configuration-item property.

20. A system as recited in claim 19 wherein said property is a class of computer processes.

21. A system as recited in claim 20 wherein processes of said class use an Internet Protocol Application Layer to communicate with each other.

22. A system as recited in claim 12 wherein said first perspective defines a first property corresponding to configuration items to which a selected configuration item has access and that share a second property, said query returning configuration items to which said first configuration item has access and that have said second property.

\* \* \* \* \*